Mar. 6, 1923.
A. H. SELL.
ILLUMINATING ATTACHMENT FOR AUTOMOBILES.
FILED JUNE 15, 1922.
1,447,902.
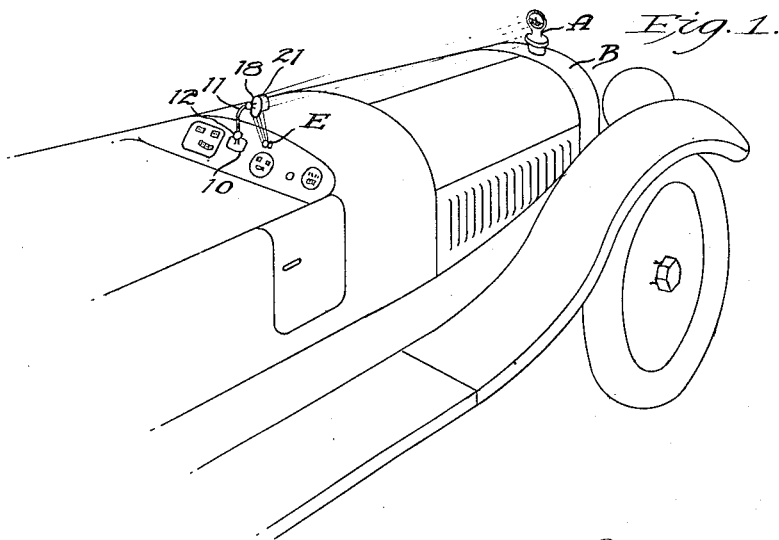
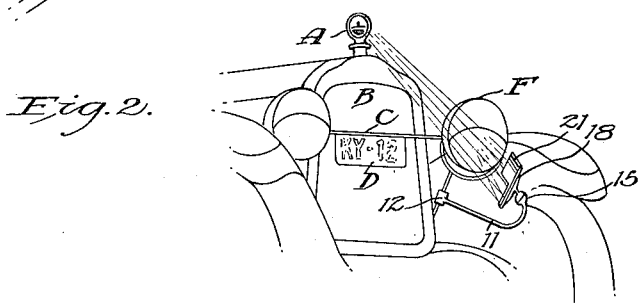
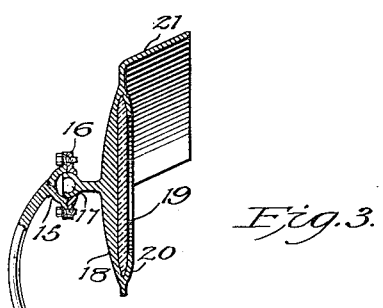
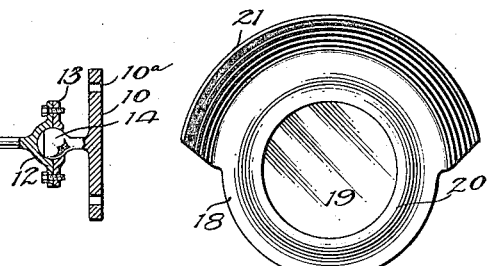
WITNESSES
INVENTOR
Augustus H. Sell
BY
ATTORNEYS Patented Mar. 6, 1923.

1,447,902

UNITED STATES PATENT OFFICE.

AUGUSTUS HARMON SELL, OF NEWARK, NEW JERSEY.

ILLUMINATING ATTACHMENT FOR AUTOMOBILES.

Application filed June 15, 1922. Serial No. 568,485.

*To all whom it may concern:*

Be it known that I, AUGUSTUS HARMON SELL, a citizen of the United States of America, and a resident of Newark, in the county of Essex and State of New Jersey, have invented a new and Improved Illuminating Attachment for Automobiles, of which the following is a description.

My invention relates to an illuminating means for attachment to an automobile. Particularly the invention relates to an attachment embodying a reflector for throwing the light to the object or area to be illuminated, such as a meter or ornament mounted on a radiator or to illuminate the license tag by reflecting light from one of the lamps on the automobile, for example, a lamp on the dashboard or one of the headlights.

The general object of my invention is to provide an efficient illuminating device and particularly to provide a simple mounting means for the reflecting mirror, and a novel means to shield the reflector against dust or rain.

Reference is to be had to the accompanying drawings forming a part of this specification, it being understood that the drawings are merely illustrative of practical examples of the invention.

Figure 1 is a diagrammatic view in perspective of a front portion of an automobile indicating my improved attachment thereon for illuminating a meter or an ornament on the radiator cap;

Figure 2 is a front perspective view of a portion of an automobile indicating the attachment for reflecting light from one of the headlights to the device on the radiator cap;

Figure 3 is a longitudinal vertical section of my illuminating device;

Figure 4 is a front view thereof, the bracket being broken away for the major portion.

In the drawings the letter A indicates a meter or temperature indicating device on the cap of the radiator B. Said device may be of the form shown in my copending application No. 569,897 filed June 21st, 1922. C indicates a bar for carrying the license tag D; E indicates a lamp on the dashboard; and F, one of the headlights.

In carrying out my invention in practice a bracket 10 is provided, having means to secure it in position, there being indicated in Figure 3 holes 10ª to receive screws or other fasteners for securing the base in position.

On the bracket is secured a supporting bar 11 through the medium of a combined clamp and universal joint comprising a clamp member 12 rigid with the bar 11, and a ring 13 clamped thereto, said clamp member and clamp ring 13 jointly embracing the ball head 14 rigid with the base 10.

The opposite end of the bar 11 is directed laterally preferably on curved lines and supports the mirror back 18 of the reflector, the connection with the reflector being through the medium of the combined clamp and ball and socket joints similar to that of the arrangement at the first-mentioned end and comprising a clamp element 15 rigid on the terminal of the bar 11 and the clamp ring 16, the two jointly embracing a ball head 17 on the mirror back 18. The mirror 19 is secured on the back 18 preferably by producing an integral front flange 20 on said back.

I provide a guard or shield to shed rain and dust from the face of the mirror 19, the same being in the form of an arcuate hood 21 oblique to the plane of the mirror and rigid with the back 18 thereof.

With the described construction the base 10 may be mounted on the dashboard and the mirror adjusted through the ball and socket connections to reflect the light from the lamp E on the dashboard forwardly to the meter or ornament A. Or, the clamp composed of the elements 12, 13 may be secured to the standard of a headlight F as in Figure 2.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claim. For example, the hood 21 may be omitted as when intended for support on the dashboard.

The device serves to effectively illuminate an object or an area desired and has the advantage of utilizing the light emitted by the ordinary lights with which an automobile is equipped. It will thus be seen that this device does not need additional equipment to be placed on the automobile and that a saving in electrical current is effected where the lighting of the automobile is accomplished through electrical operation.

Having thus described my invention, I claim:

In an illuminating device of the class described, a rod presenting a socket at each end thereof, a clamping element adapted to be clamped to an automobile frame, a head on said clamping element adjustably fitting in one of said sockets to permit the other socket to be positioned in a beam of light emitted from a light of the automobile, a reflector, and a head at the rear of said reflector adjustably fitting in said other socket to permit an adjustment of said reflector on the bar to deflect the light rays of said beam to an object desired to be illuminated.

AUGUSTUS HARMON SELL.